United States Patent
Balsiger et al.

(10) Patent No.: US 9,528,587 B2
(45) Date of Patent: Dec. 27, 2016

(54) HARMONIC DRIVE AND METHOD OF ASSEMBLING

(71) Applicant: Hamilton Sundstrand Corporation, Windsor Locks, CT (US)

(72) Inventors: Derick S. Balsiger, Mayer, AZ (US); Nicholas R. Van De Veire, Tempe, AZ (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 29 days.

(21) Appl. No.: 14/325,879

(22) Filed: Jul. 8, 2014

(65) Prior Publication Data

US 2016/0010738 A1     Jan. 14, 2016

(51) Int. Cl.
*F16H 35/00* (2006.01)
*F16H 49/00* (2006.01)

(52) U.S. Cl.
CPC .................. *F16H 49/001* (2013.01)

(58) Field of Classification Search
CPC ..................................... F16H 49/001
USPC ........................................... 74/640
See application file for complete search history.

(56) References Cited

U.S. PATENT DOCUMENTS

| | | | | |
|---|---|---|---|---|
| 4,825,720 A * | 5/1989 | Capdepuy | ............. | F16H 49/001 74/468 |
| 6,099,271 A * | 8/2000 | Brookbank | ........... | F04D 29/047 384/309 |
| 6,257,186 B1 * | 7/2001 | Heer | ....................... | F01L 1/024 123/90.17 |
| 6,302,073 B1 * | 10/2001 | Heer | ........................ | F01L 1/34 123/90.15 |
| 6,672,181 B2 * | 1/2004 | Kobayashi | ............ | F16H 49/001 74/640 |
| 6,893,371 B2 * | 5/2005 | Mills | ....................... | F16H 63/18 475/149 |
| 7,770,688 B2 * | 8/2010 | Kenez | .................... | B62D 5/008 180/443 |
| 2011/0245006 A1 * | 10/2011 | Negishi | .................. | B25J 9/1025 475/149 |

OTHER PUBLICATIONS

U.S. Appl. No. 14/086,001; entitled "Compound Harmonic Drive," filed Nov. 21, 2013; Inventor: Derick S. Balsiger.
U.S. Appl. No. 14/027,788; entitled "Compound Harmonic Drive," filed Sep. 16, 2013; Inventors: Stepan Lunin, Derick S. Balsiger.

* cited by examiner

*Primary Examiner* — Ha D Ho
(74) *Attorney, Agent, or Firm* — Cantor Colburn LLP

(57) ABSTRACT

A harmonic drive includes a flexible gear. Also included is a ring gear that meshes with the flexible gear. Further included is a rotor. Yet further included is a wave generator sleeve directly fitted over an outer surface of the rotor, wherein the wave generator sleeve is disposed radially within the flexible gear. Also included is a bearing assembly disposed between the wave generator sleeve and the flexible gear, wherein the wave generator rotates the flexible gear as the wave generator sleeve is rotated by the rotor.

14 Claims, 2 Drawing Sheets

HARMONIC DRIVE AND METHOD OF ASSEMBLING

BACKGROUND OF THE INVENTION

The embodiments herein relate to gear systems and, more particularly, to harmonic drive gear systems, as well as a method of assembling such systems.

Aircraft typically include flight control surfaces on aircraft wing structures that are moved and positioned in order to alter the lift characteristics of the wing structures. Actuators are coupled to the flight control surfaces and control and guide the movement of the flight control surfaces between positions. Generally, there are two types of actuators used in aircraft: linear actuators and rotary actuators. Conventionally, a rotary actuator uses an epicyclic-type reduction gear drive, commonly referred to as a planetary gear drive, to step down high speed rotation imputed by an electric drive motor. It is also common for a rotary actuator to use a planetary gear drive with multiple stages (multiple sets of planet gears) to increase the reduction ratio and torque-to-weight ratio of the planetary gear drive. While incorporating multiple stages into the planetary gear drive increases the reduction ratio and torque-to-weight ratio of the planetary gear drive, it also undesirably increases the size, weight, and complexity of the planetary gear drive.

Presently, the construction of aircraft wings is moving toward a thin-winged design, where the overall thickness of the wings is decreased from previous designs. Because the thickness of the wings is being decreased, it is becoming increasingly difficult to fit a conventional rotary actuator with a planetary gear drive within the cross-section of the wings, especially when the planetary gear drive incorporates multiple stages. The diameter of the planetary gear drive can be decreased in order to fit it within the reduced wing cross-sectional area, however, the size of the teeth must also be decreased in order to maintain the high reduction ratio. Reducing the size of the teeth is undesirable because it lowers the torque-to-weight ratio of the planetary gear drive while also increasing the manufacturing tolerances and cost of the planetary gear drive.

BRIEF DESCRIPTION OF THE INVENTION

According to one embodiment, a harmonic drive includes a flexible gear. Also included is a ring gear that meshes with the flexible gear. Further included is a rotor. Yet further included is a wave generator sleeve directly fitted over an outer surface of the rotor, wherein the wave generator sleeve is disposed radially within the flexible gear. Also included is a bearing assembly disposed between the wave generator sleeve and the flexible gear, wherein the wave generator rotates the flexible gear as the wave generator sleeve is rotated by the rotor.

According to another embodiment, a method of assembling a harmonic drive is provided. The method includes positioning a wave generator sleeve radially within a flexible gear and a bearing assembly, the flexible gear comprising radially-outward-extending teeth. The method also includes positioning a ring gear around a portion of the flexible gear such that radially-inward-extending teeth of the ring gear mesh with the radially-outward-extending teeth of the flexible gear. The method further includes directly fitting the wave generator sleeve to an outer diameter of a rotor configured to rotate the wave generator and the flexible gear.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
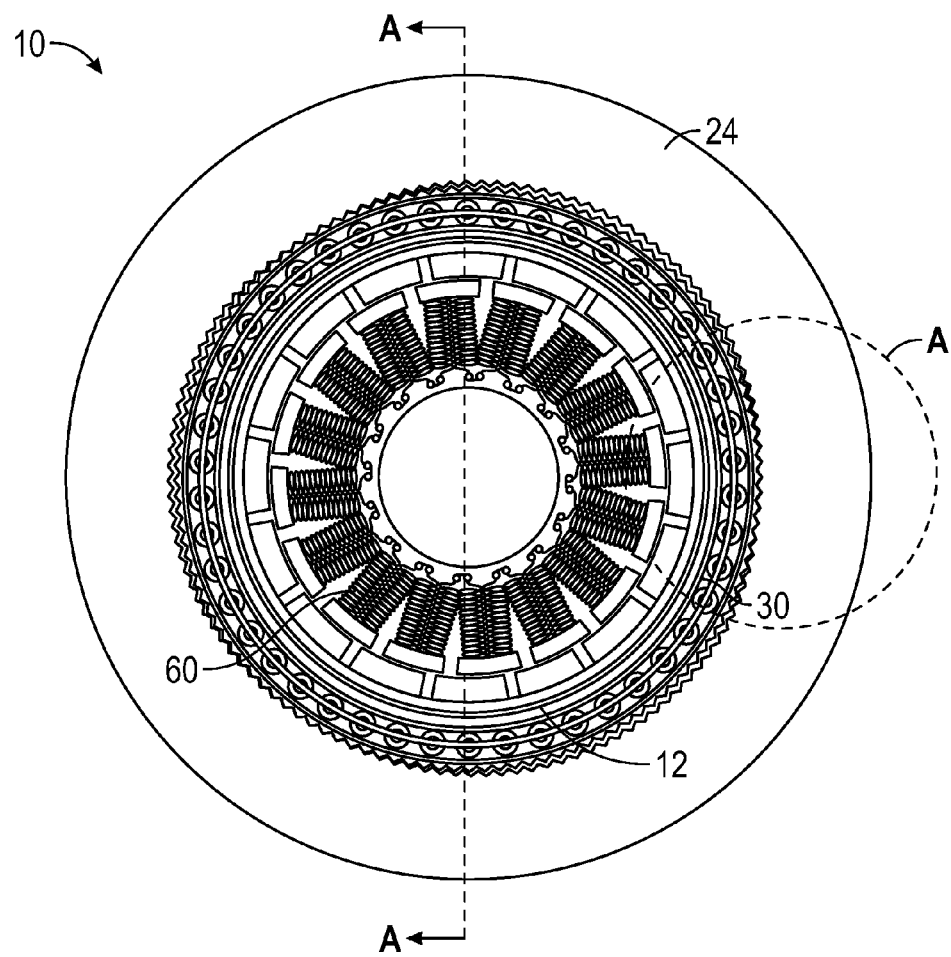
FIG. 1 is an end view of the harmonic drive assembly.
Figure 2:
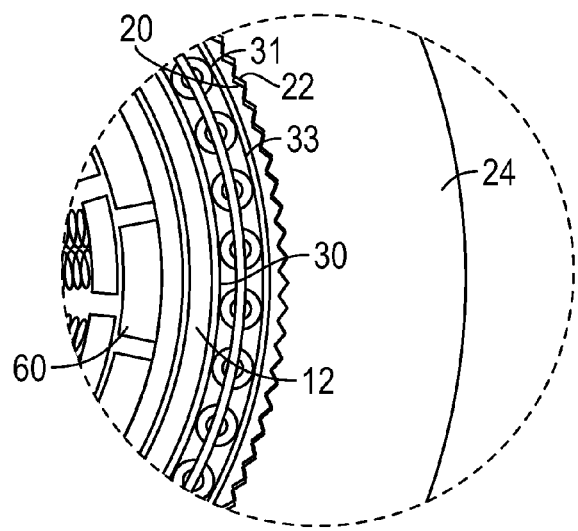
FIG. 2 is an end view of the harmonic drive assembly according to section A of FIG. 1.
Figure 3:
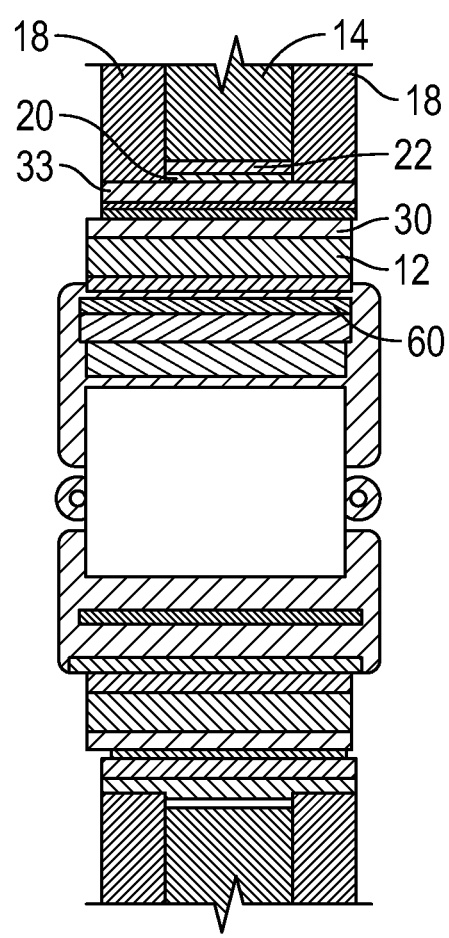
FIG. 3 is a cross-sectional view of the harmonic drive assembly according to line A-A of FIG. 1.

Referring to FIGS. 1-3, a schematic diagram illustrates a harmonic drive assembly 10. As shown, an input 12, an output 14, and a ground 18 are connected to the harmonic drive assembly 10. In addition, more than one output can come out of harmonic drive assembly 10. The harmonic drive assembly 10 also includes a first flexible gear 20, a second flexible gear 22, a ring gear 24, and a wave generator sleeve 30. An embedded stator assembly 60 is disposed radially inwardly of the input (also referred to herein as a rotor) 12 and is configured to cause rotation of the input 12. The harmonic drive assembly 10 can further include other components and features not specifically shown or discussed.

The second flexible gear 22 is larger in diameter than the first flexible gear 20 and is coaxial with the first flexible gear 20. The first flexible gear 20 and the second flexible gear 22 are connected or integrated such that the first flexible gear 20 and the second flexible gear 22 may rotate together. The wave generator sleeve 30 is disposed radially inwardly of the first flexible gear 20 and the second flexible gear 22 and engages both the first flexible gear 20 and the second flexible gear 22, directly or indirectly. The wave generator sleeve 30 typically includes an elliptical or otherwise noncircular geometry, such as the tri-lobular geometry illustrated.

The wave generator sleeve 30 is directly fitted to the input 12. The input 12 can be an output shaft (referred to herein as a "rotor") of an electric drive motor, a hydraulic rotary drive, or other suitable torque source, and rotates the wave generator sleeve 30. The wave generator sleeve 30 is directly fitted to an outer surface 52 of the input 12 via any suitable process that establishes a tight, fitting securement between the wave generator sleeve 30 and the input 12. In some embodiments, the wave generator sleeve 30 is thermally fitted to the shaft in a thermal process that hardens the wave generator sleeve 30. In some embodiments, the wave generator sleeve 30 is directly fitted to the input 12 with a high-strength adhesive. Regardless of the precise manner in which the wave generator sleeve 30 is directly fitted onto the input 12, the wave generator sleeve 30 comprises a hardenable material that is well-suited for a hardening process that allows the wave generator sleeve 30 to support a bearing assembly 31 located radially outwardly of the wave generator sleeve 30 and radially inwardly of an outer bearing race 33. The material of the wave generator sleeve 30 may be steel, a steel alloy, a stainless steel, or any alternative having properties similar to any of the examples provided. In some embodiments, the wave generator sleeve 30 is formed of a material similar or identical to the material of the rotor. In other embodiments, the wave generator sleeve 30 is formed of a material different than that of the rotor.

As the input 12 rotates the wave generator sleeve 30, the wave generator sleeve 30 causes the flexible gear 20 to rotate in the opposite direction from wave generator sleeve 30.

Advantageously, by directly fitting the wave generator sleeve 30 on the input (i.e., shaft), additional fastening and intermediate components are eliminated, thereby reducing the volume, mass, and inertia of the overall system, while increasing power density.

In operation, the harmonic drive assembly 10 steps down the input 12 to the output 14. The input 12 rotates the wave generator sleeve 30 at a first rate in a first direction. The wave generator sleeve 30 rotates the flexible gear 20 inside the ring gear 24 at a second rate that is slower than the first rate, and in a second direction opposite to the first direction. For example, if the flexible gear 20 has x teeth, and the ring gear 24 has x+1 teeth meshing with the x teeth of the flexible gear 20, then the flexible gear 20 will rotate at 1/x the rate in the opposite direction as the rate of the input 12 and the wave generator sleeve 30. The ring gear 24 is a rigid circular ring having a plurality of radially-inwardly oriented teeth. The flexible gear 20 and the wave generator 30 are placed inside the ring gear 24, thereby meshing the radially-outwardly oriented teeth of the flexible gear 20 and the teeth of the ring gear 24. Because the flexible gear 20 has an elliptical or lobular shape, its teeth only mesh with the teeth of the ring gear 24 in select regions of the flexible gear 20. As noted above, there are fewer teeth on the flexible gear 20 than there are on the ring gear 24, so that for every full rotation of the wave generator 30, the flexible gear 20 would be required to rotate a slight amount backwards relative to the ring gear 24. Thus, the rotation action of the wave generator 30 results in a much slower rotation of the flexible gear 20 in the opposite direction, and a higher reduction ratio is thereby achieved.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A harmonic drive comprising:
   a first flexible gear;
   a second flexible gear disposed about and connected to the first flexible gear;
   a ring gear that meshes with at least one of the first flexible gear and the second flexible gear;
   a rotor;
   a wave generator sleeve directly fitted over an outer surface of the rotor, wherein the wave generator sleeve is disposed radially within the first flexible gear and the second flexible gear and engages at least one of the first flexible gear and the second flexible gear; and
   a bearing assembly disposed between the wave generator sleeve and the first flexible gear, wherein the wave generator sleeve rotates at least one of the first and second flexible gears as the wave generator sleeve is rotated by the rotor.

2. The harmonic drive of claim 1, further comprising:
   a stator assembly disposed radially inwardly of the rotor and configured to impose rotation of the rotor.

3. The harmonic drive of claim 1, wherein the wave generator sleeve is thermally fitted to the output shaft of the rotor.

4. The harmonic drive of claim 1, wherein the wave generator sleeve is directly fitted over the output shaft of the rotor with an adhesive.

5. The harmonic drive of claim 1, wherein the wave generator sleeve comprises a hardenable material.

6. The harmonic drive of claim 5, wherein the hardenable material comprises steel.

7. The harmonic drive of claim 5, wherein the hardenable material comprises stainless steel.

8. The harmonic drive of claim 1, wherein the bearing assembly is located radially outwardly of the wave generator sleeve.

9. The harmonic drive of claim 5, wherein the wave generator sleeve comprises a sleeve material and the rotor comprises a rotor material, wherein the sleeve material is different than the rotor material.

10. A method of assembling a harmonic drive comprising:
    positioning a wave generator sleeve radially inward of a first flexible gear and a second flexible gear and radially outward of a bearing assembly;
    positioning a ring gear around a portion of at least one the first flexible gear and the second flexible gear such that the ring gear meshes with at least one of the first flexible gear and the second flexible gear; and
    directly fitting the wave generator sleeve to a rotor configured to rotate the wave generator sleeve and at least one of the first flexible gear and the second flexible gear.

11. The method of claim 10, wherein the wave generator sleeve is directly fitted to the outer diameter of the rotor with a thermal fitting process.

12. The method of claim 11, wherein the wave generator sleeve is directly fitted to the outer diameter of the rotor with an adhesive.

13. The method of claim 10, wherein the wave generator sleeve is positioned to be a bearing assembly support.

14. The method of claim 11, wherein the thermal fitting process shrinks the wave generator sleeve to provide a fitted configuration.

* * * * *